(12) United States Patent
Chen

(10) Patent No.: US 8,987,018 B2
(45) Date of Patent: Mar. 24, 2015

(54) METHOD FOR FORMING A LIGHT-EMITTING CASE AND RELATED LIGHT-EMITTING MODULE

(75) Inventor: Chih-Kang Chen, Miaoli County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 534 days.

(21) Appl. No.: 13/332,476

(22) Filed: Dec. 21, 2011

(65) Prior Publication Data

US 2012/0091498 A1    Apr. 19, 2012

Related U.S. Application Data

(63) Continuation-in-part of application No. 12/427,764, filed on Apr. 22, 2009, now Pat. No. 8,097,477.

(51) Int. Cl.
| | |
|---|---|
| H01L 21/00 | (2006.01) |
| B29C 45/14 | (2006.01) |
| H05B 33/04 | (2006.01) |
| H05B 33/10 | (2006.01) |
| B29L 31/34 | (2006.01) |
| F21Y 105/00 | (2006.01) |
| H04M 1/02 | (2006.01) |
| H04M 1/22 | (2006.01) |

(52) U.S. Cl.
CPC .......... *B29C 45/14778* (2013.01); *H05B 33/04* (2013.01); *H05B 33/10* (2013.01); *B29K 2995/0036* (2013.01); *B29L 2031/3437* (2013.01); *F21Y 2105/008* (2013.01); *H04M 1/0283* (2013.01); *H04M 1/22* (2013.01)
USPC .......... 438/26; 438/29; 257/99; 257/100; 257/E33.058; 257/E33.059

(58) Field of Classification Search
CPC .......... H01L 21/67121; H01L 21/67126; H01L 33/48; H01L 33/52; H01L 33/54; H01L 33/56; H01L 2221/68313
USPC .......... 257/40, 99, 100, E33.056, E33.058, 257/E33.059; 438/26, 29
See application file for complete search history.

(56) References Cited

U.S. PATENT DOCUMENTS

2006/0273304 A1* 12/2006 Cok .................... 257/40
2007/0210400 A1* 9/2007 Moribayashi et al. ........ 257/440

* cited by examiner

*Primary Examiner* — Colleen A Matthews
*Assistant Examiner* — Colleen E Snow
(74) *Attorney, Agent, or Firm* — Li & Cai Intellectual Property (USA) Office

(57) ABSTRACT

A method for manufacturing a light-emitting case includes forming a flat panel light emitting diode, and covering the flat panel light emitting diode with transparent plastic material. The transparent plastic material has properties of flexibility, high gas-resistance and water-resistance. When the light-emitting case is forced, the shape of the light-emitting case can be changed.

17 Claims, 8 Drawing Sheets

METHOD FOR FORMING A LIGHT-EMITTING CASE AND RELATED LIGHT-EMITTING MODULE

CROSS-REFERENCE TO RELATED APPLICATIONS

This application is a Continuation-in-Part of application Ser. No. 12/427,764, filed on Apr. 22, 2009, and entitled METHOD FOR FORMING A LIGHT-EMITTING CASE AND RELATED LIGHT-EMITTING MODULE.

BACKGROUND OF THE INVENTION

1. Field of the Invention

The present invention relates to a method for forming a light-emitting case and a related light-emitting module, and more specifically, to a method for covering a flat panel light emitting diode with a case and a related light-emitting module.

2. Description of Related Art

In general, a light-emitting case is usually used for illuminated display of models, trademarks, or function key patterns on an electronic device, providing additional light in a dark environment, or generating a flashing warning.

In the following, illuminated display of function key patterns on a mobile phone is taken as an example. A common method involves disposing a spot light source (e.g. a white LED) or a surface light source (e.g. a cold light source) under a transparent control board where a pattern layer corresponding to the function key patterns is printed. When a user wants to use the function keys to perform corresponding operations (e.g. answering the phone, sending messages, dialing phone numbers, etc.), the said light source disposed under the transparent control board is switched on. Subsequently, light emitted by the light source passes through the pattern layer so that the function key patterns on the pattern layer may be illuminated accordingly. Thus, even in a dark environment, the user may still view the locations of the function keys clearly.

Please refer to FIG. 1, which is a diagram of a light-emitting module 10 according to the prior art. As shown in FIG. 1, the light-emitting module 10 utilizes a spot light source 12 for brightening a case 14. In order to generate uniform light distribution on the case 14, it is necessary to dispose a light guide mechanism on the light-emitting module 10. However, the additional light guide mechanism may not only complicate the structural design of the light-emitting module 10, but may also increase the manufacturing cost of the light-emitting module 10.

Furthermore, as shown in FIG. 1, if the case 14 has a curved surface, disposal of additional reflection pads 16 along with the curved surface is necessary for guiding light toward each portion of the case 14 uniformly. However, the said complicated disposal of the reflection pads 16 may ruin the appearance of the light-emitting module 10. Furthermore, brightness attenuation caused by multiple reflections of light may also result in uneven brightness distribution on the light-emitting module 10.

Thus, how to manufacture a light-emitting case capable of generating uniform light distribution without an additional light-guide mechanism that is suitable for a curved surface should be a concern in light-emitting module structural design.

SUMMARY OF THE INVENTION

The present invention provides a method for manufacturing a light-emitting case comprising forming a flat panel light emitting diode, the flat panel light emitting diode at least having a light-emitting layer and an electrode set formed on the light-emitting layer; covering the flat panel light emitting diode with a transparent case structure. The flat panel light emitting diode and the transparent case structure are formed of flexible materials by application of force to curve or bend the light-emitting case into a required shape.

The present invention further provides a light-emitting module having a PLED comprising a flat panel light emitting diode comprising a light-emitting layer; and an electrode set electrically connected to the light-emitting layer and a case structure formed with the flat panel light emitting diode integrally. The flat panel light emitting diode and the transparent case structure are formed of flexible materials by application of force to curve or bend the light-emitting case into a required shape.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
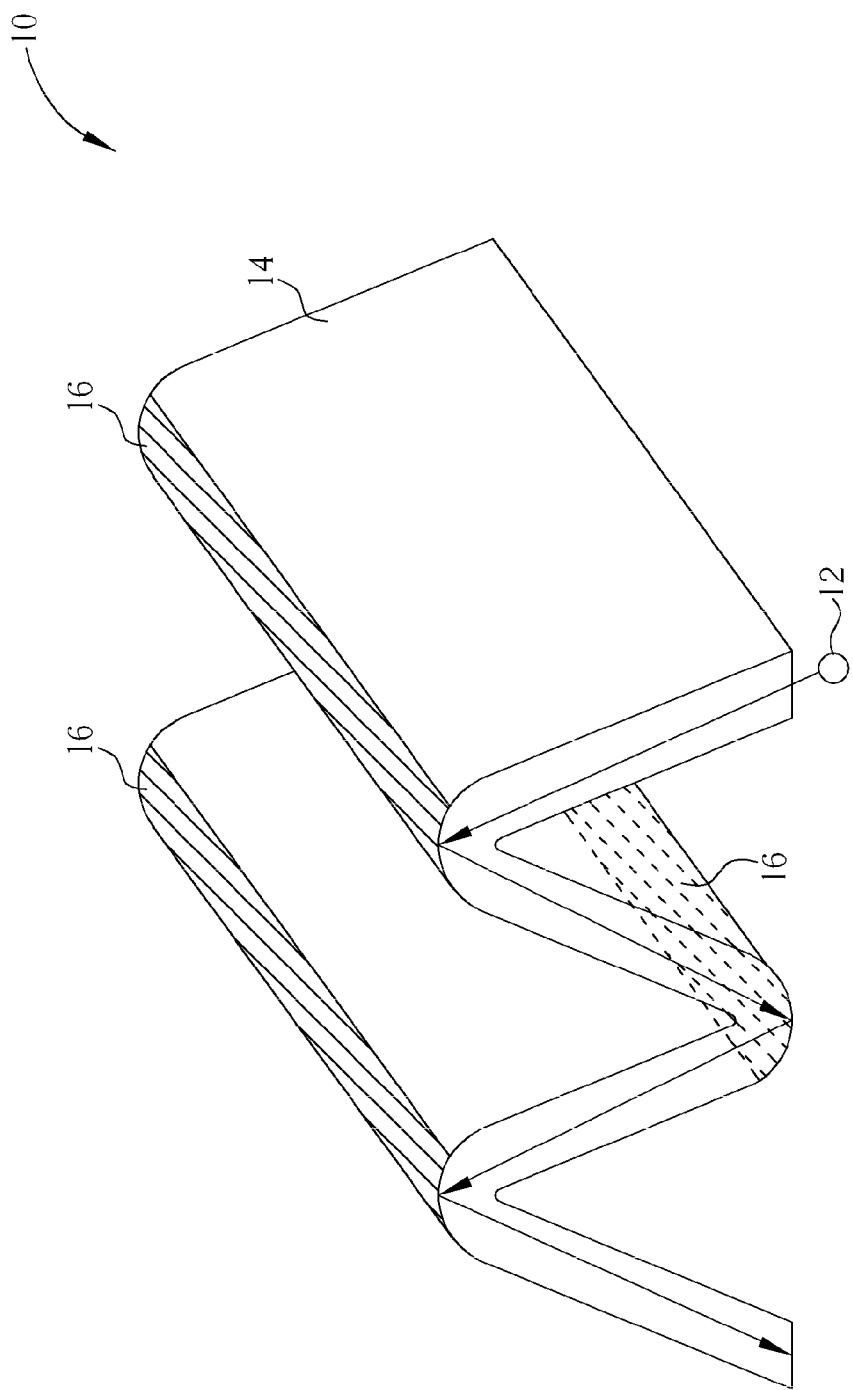
FIG. 1 is a diagram of a light-emitting module according to the prior art.
Figure 2:
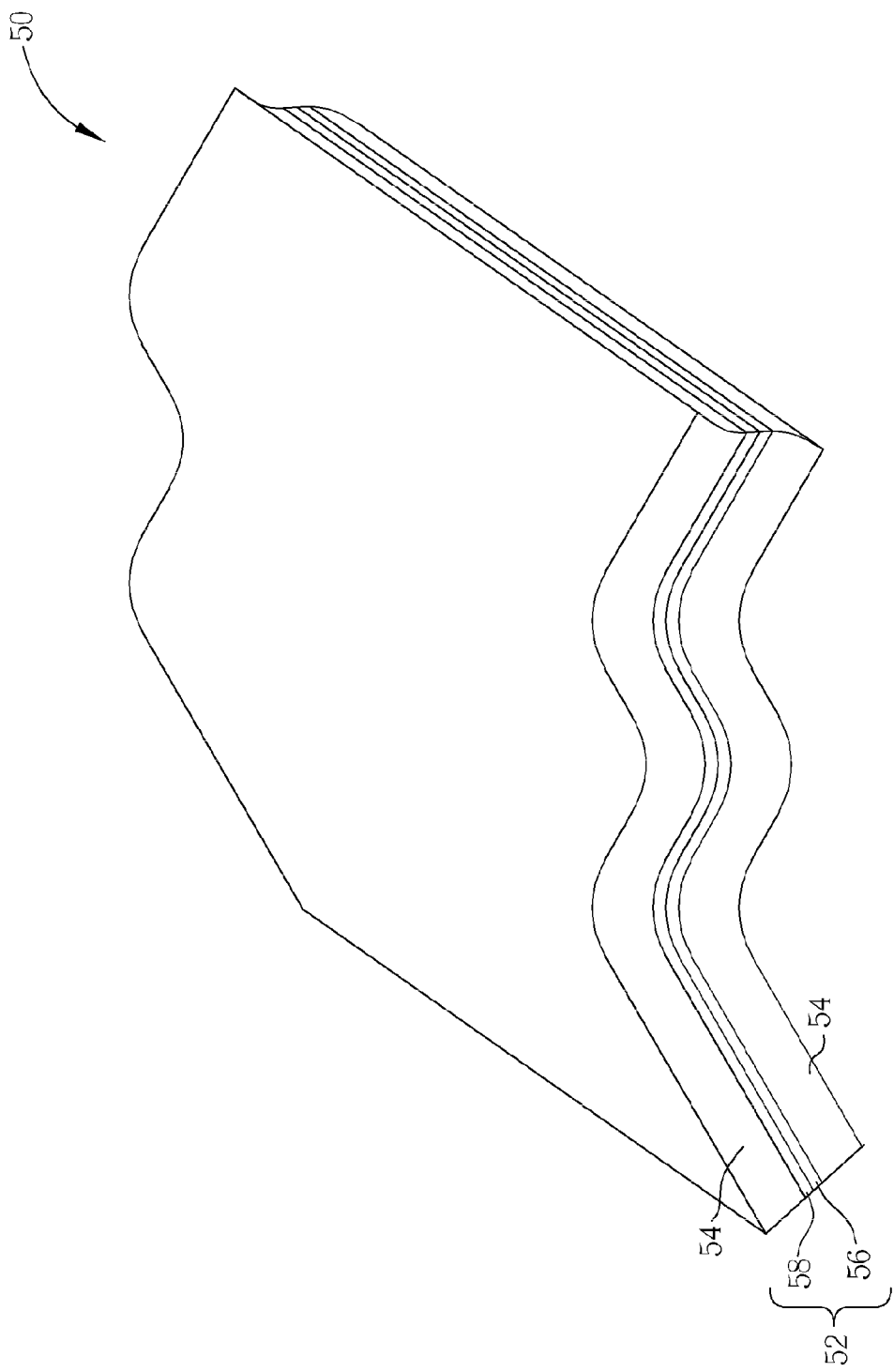
FIG. 2 is a partial diagram of a light-emitting module according to a preferred embodiment of the present invention.

Please refer to FIG. 2, which is a partial diagram of a light-emitting module 50 according to a preferred embodiment of the present invention. The light-emitting module 50, which may be applied as a light-emitting case, comprises a flat panel light emitting diode 52 and a case structure 54. As shown in FIG. 2, the case structure 54 sheathes the flat panel light emitting diode 52 for protection of the flat panel light emitting diode 52. The case structure 54 is preferably a case corresponding to an electronic device (e.g. a mobile phone, a notebook, etc.), and is preferably made of ABS (Acrylonitrile-Butadiene-Styrene) material. The flat panel light emitting diode 52 is a planar light source, which may be a PLED (Polymer Light Emitting Diode) or an OLED (Organic Light Emitting Diode), and the flat panel light emitting diode 52 at least comprises a light-emitting layer 56 and an electrode set 58. The electrode set 58 is formed on and electrically connected to the light-emitting layer 56. Generally speaking, the electrode set 58 may comprise common PLED electrode elements, such as a metal negative pole and an ITO positive pole, for controlling the light-emitting layer 56 to emit light or not.

More detailed description for the light-emitting module 50 is provided as follows. Please refer to FIG. 3, which is a flowchart of forming the light-emitting module 50 in FIG. 2.

Figure 3:
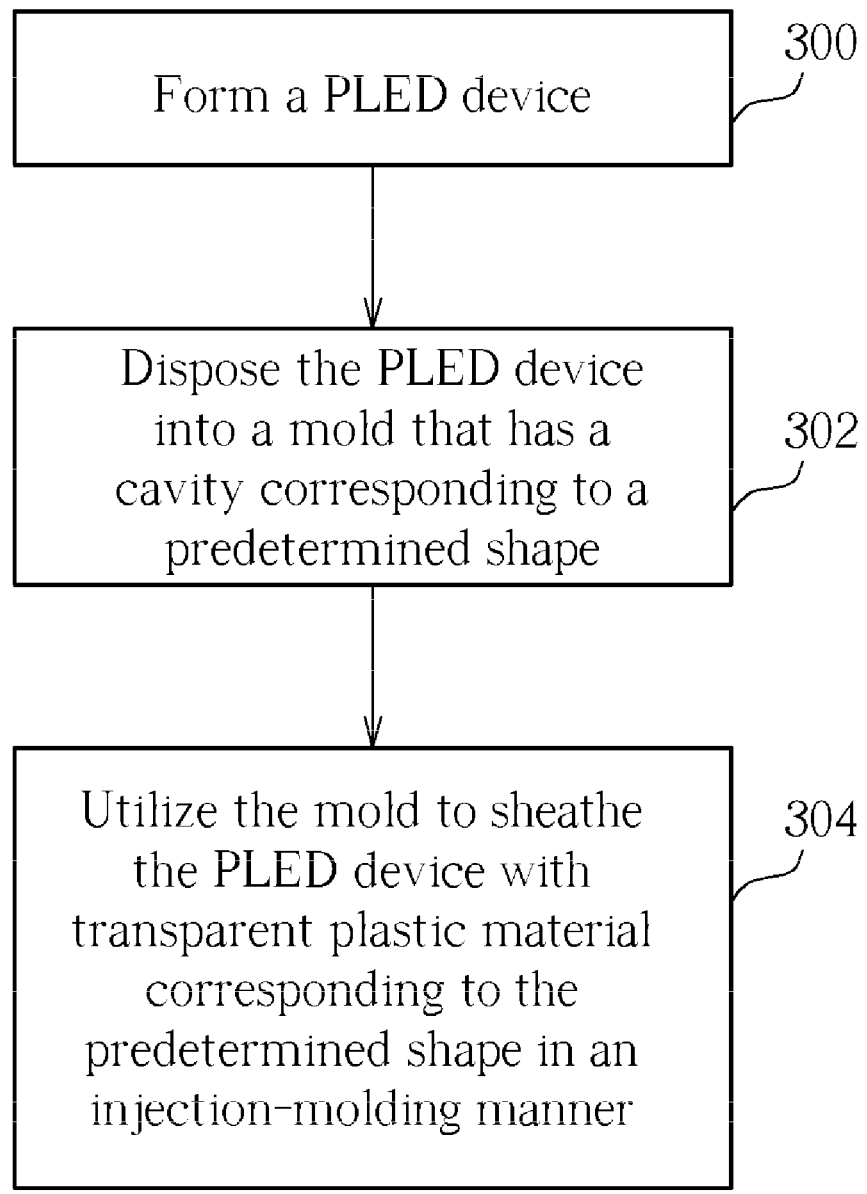
FIG. 3 is a flowchart of forming the light-emitting module in FIG. 2.

As shown in FIG. 3, the flat panel light emitting diode 52 is formed (Step 300). In the exemplary embodiment, the flat panel light emitting diode 52 is a PLED that is an LED having conjugated polymer material as a light-emitting layer. The light-emitting principle of the PLED involves applying voltage to a metal negative pole and an ITO positive pole on the conjugated polymer material. As a result, electrons provided by the metal negative pole and holes provided by the ITO positive pole may be driven by the applied voltage to combine in the conjugated polymer material, so as to emit light. The PLED may be formed by a simple and time-saving coating process, since conjugated polymer material used in the PLED may be dissolved in a dissolvent. The said coating process may be a commonly-used coating technology in the prior art, such as a spin coating process, an ink-jet printing process, a screen printing process, etc., and the related description is therefore omitted herein.

After forming the flat panel light emitting diode 52, an IMD process is then utilized to sheathe the flat panel light emitting diode 52 with the case structure 54. The said IMD process involves disposing a plastic film with printed patterns into a mold, utilizing a vacuum process to make the shape of the plastic film correspond to a shape of a cavity in the mold, and then injecting melted thermoplastic material into the mold. After the melted thermoplastic material is cooled down and solidified in the mold, the thermoplastic material may be connected to the back surface of the plastic film where the patterns are printed, so that a pattern layer protected by the plastic film is formed correspondingly on the solidified thermoplastic material. The said IMD process is commonly applied for electronic device surface decoration.

Figure 4:
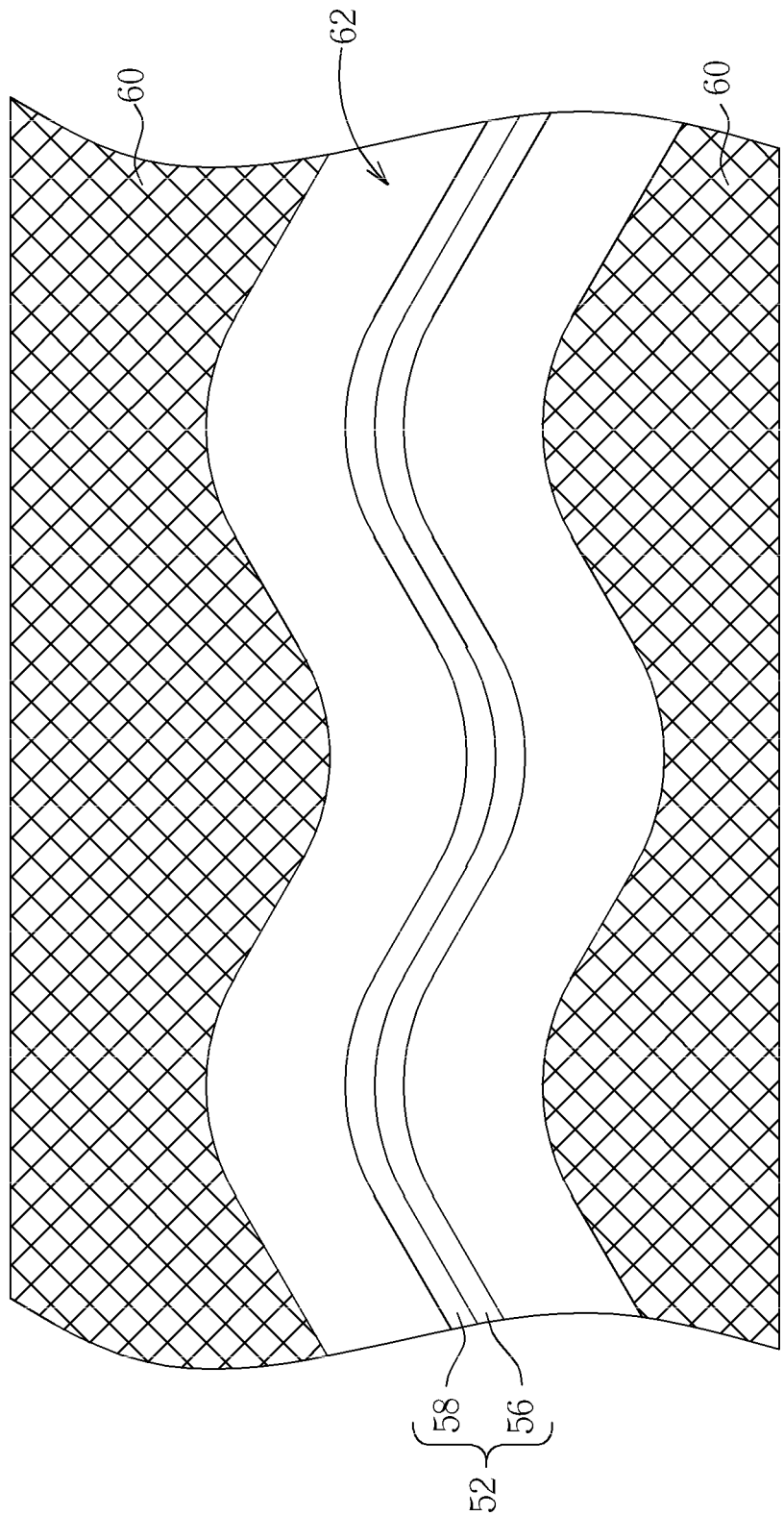
FIG. 4 is a partial cross-sectional diagram of the flat panel light emitting diode being disposed in the mold.
Figure 5:
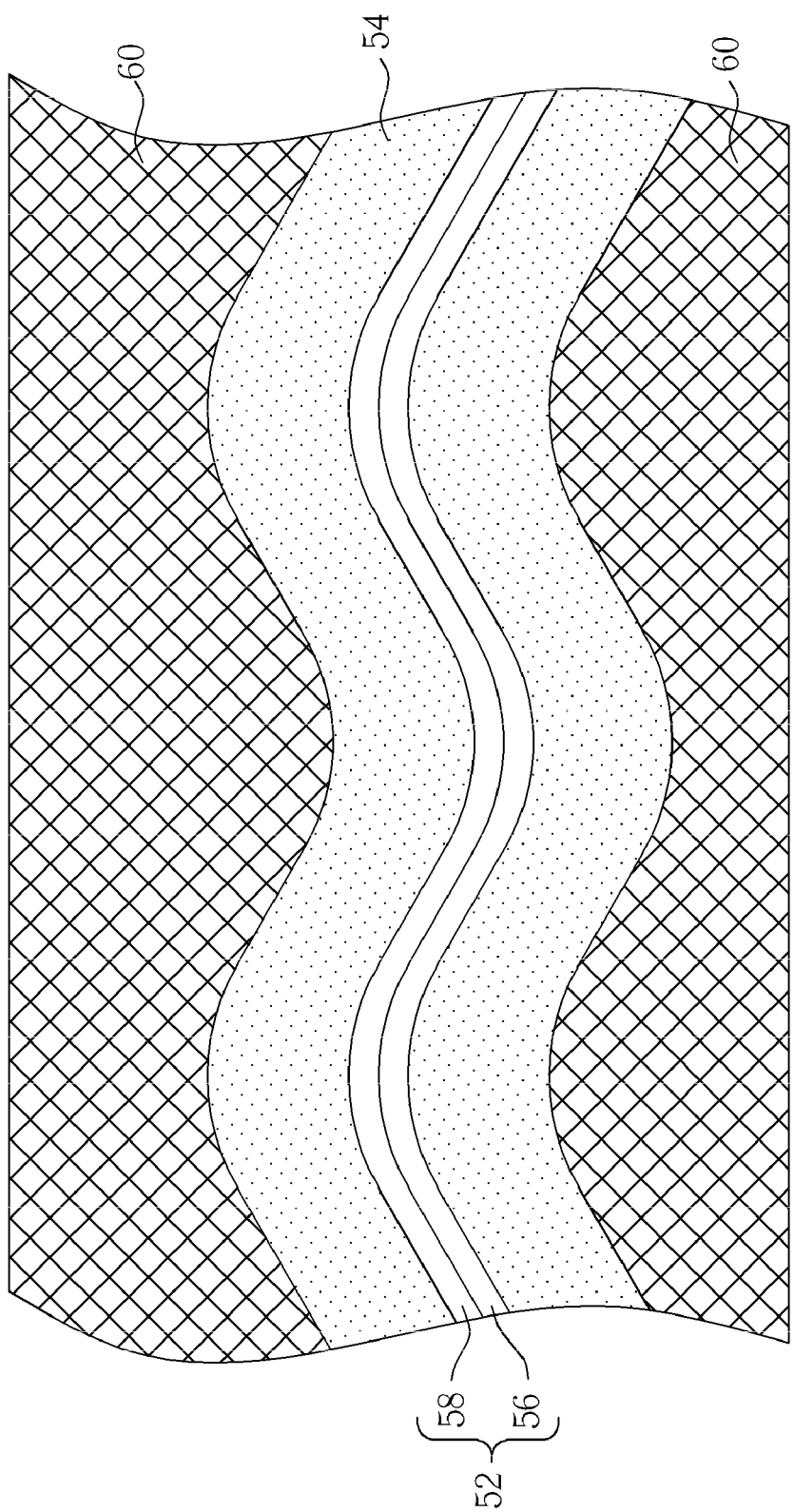
FIG. 5 is a partial cross-sectional diagram of the case structure sheathing the flat panel light emitting diode.

According to the aforementioned IMD process description, in the present invention, the flat panel light emitting diode 52 is then disposed into a mold 60 (Step 302). Since the mold 60 has a cavity 62 corresponding to a predetermined shape, e.g. a corrugated shape shown in FIG. 2, and the flat panel light emitting diode 52 is flexible, disposal of the flat panel light emitting diode 52 into the mold 60 may be as shown in FIG. 4. After disposing the flat panel light emitting diode 52 into the mold 60, the mold 60 may be utilized to sheathe the flat panel light emitting diode 52 with transparent plastic material in an injection-molding manner (Step 304). At this time, the melted transparent plastic material may sheathe the flat panel light emitting diode 52 according to the shape of cavity 62 (as shown in FIG. 5). After the melted transparent plastic material in the mold 60 is cooled down and solidified, the case structure 54, which sheathes the flat panel light emitting diode 52, is formed accordingly as shown in FIG. 2.

It should be mentioned that the structural design of the case structure 54 is not limited to the said corrugated shape shown in FIG. 2 in the present invention. In other words, no matter what shape a cavity of a mold has, the case structure 54 may be formed by the said IMD process as long as the flat panel light emitting diode 52 can use its flexibility to match the shape of the cavity in the mold. In such a manner, not only may the related application flexibility of the light-emitting case be increased, but also the problem of complicated light-guide structural design and uneven brightness distribution on a curved surface mentioned in the prior art may be avoided.

Figure 6:
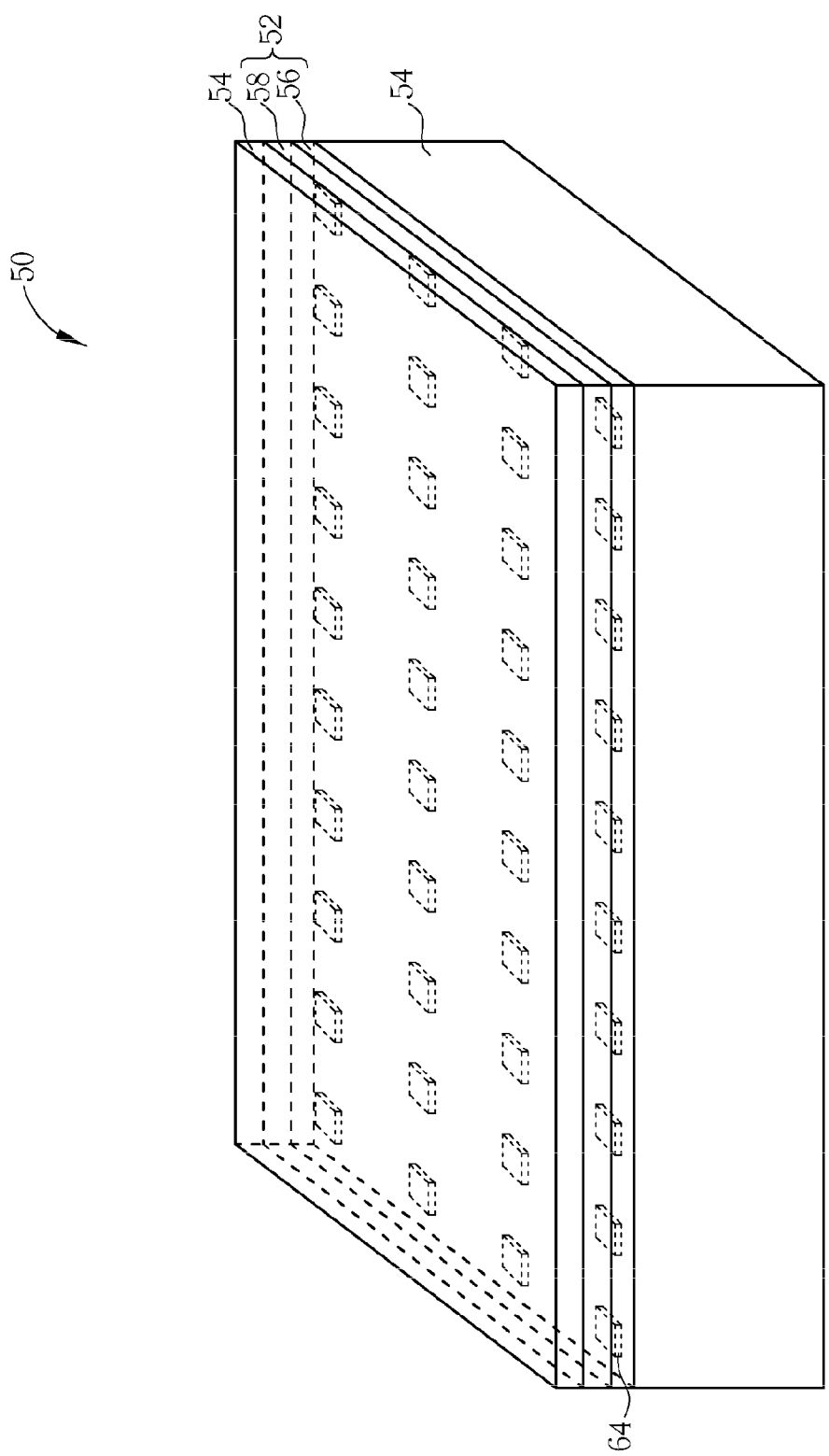
FIG. 6 is a diagram of a light-emitting layer according to another embodiment of the present invention.
Figure 7:
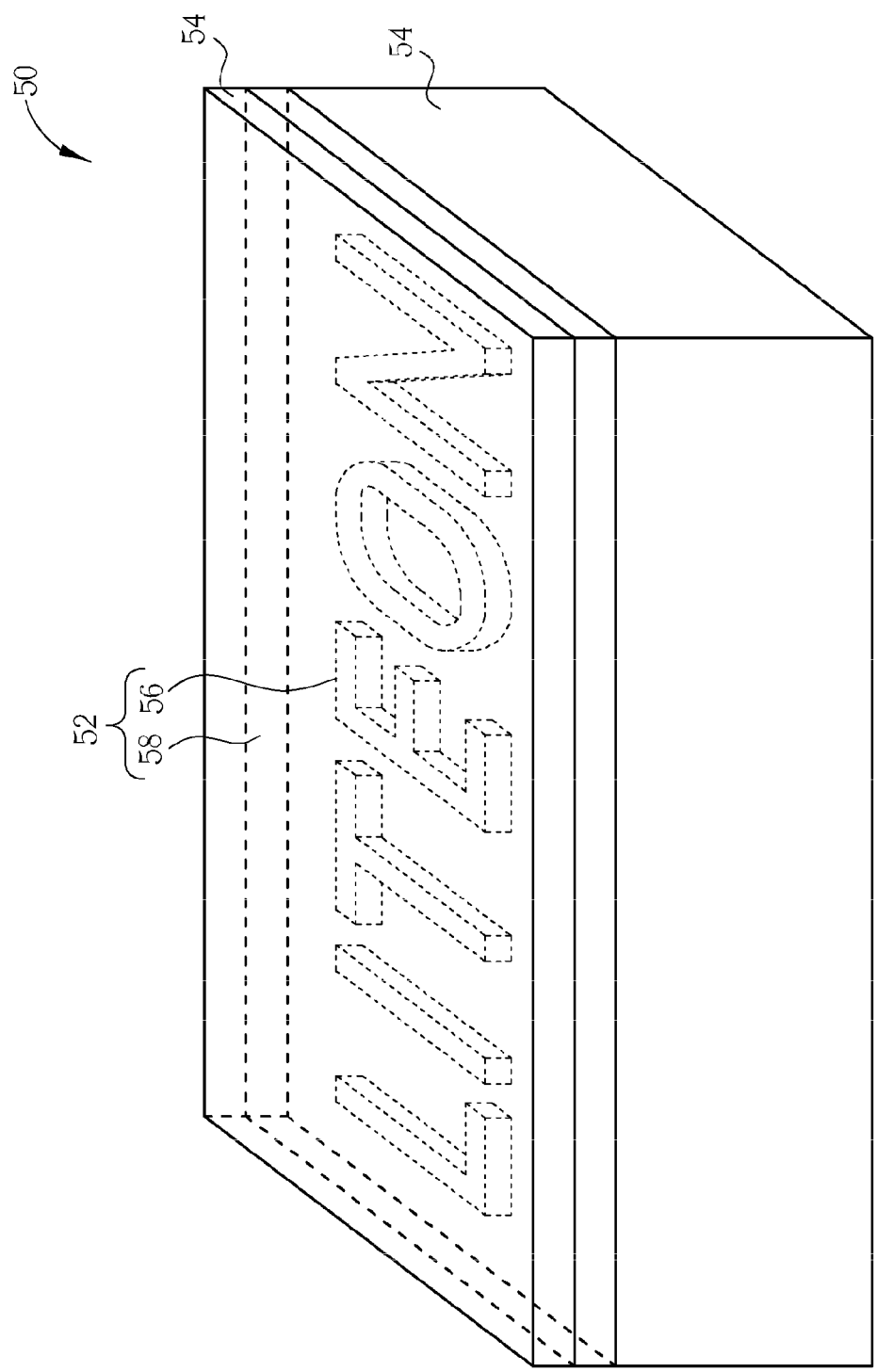
FIG. 7 is a diagram of a light-emitting layer according to another embodiment of the present invention.

Furthermore, the light-emitting layer 56 of the flat panel light emitting diode 52 is not limited to the said structural design as shown in FIG. 2. In condition of the case structure 54 being a planar structure, the light-emitting layer (i.e., the flat panel light emitting diode 52) may be composed of a plurality of light-emitting blocks 64, as shown in FIG. 6. The electrode set 58 may be used for selectively controlling the plurality of light-emitting blocks 64 in the light-emitting layer 56 to emit light or not, so that dynamic or static images may be formed correspondingly by some of the light-emitting blocks 64 which emit light. The electrode set 58 may also be used for driving each light-emitting block 64 to emit light at the same time or flash intermittently for temporary illumination or warning. Furthermore, each light-emitting block 64 may be also designated to emit light of one specific color. Thus, the said images may have a color gradient effect in a manner of different light-emitting blocks 64 emitting light of different colors. However, in the present invention, each light-emitting block 64 may also emit light of the same color for monochrome display. As for which design is utilized, it depends on practical application. On the other hand, the light-emitting layer 56 may also be arranged in a specific pattern (e.g. a "LITEON" pattern shown in FIG. 7), so that the specific pattern may be illuminated correspondingly when the light-emitting layer 56 emits light. Furthermore, the light-emitting module 50 may also be used for controlling brightness of the light-emitting layer 56 in an electric-current adjustment manner. The said method for controlling the light-emitting layer may be a common circuit logic control method in PLED application, and the related description is therefore omitted herein.

Compared with the prior art, in which a light guide mechanism is needed to make a spot light source generate wide-range light, or reflection pads are needed to solve the uneven brightness distribution problem when a spot light source emits light on a curved surface, the present invention utilizes an IMD process to sheathe a flat panel light emitting diode with a case of an electronic device. In other words, no matter whether the case of the electronic device has a planar surface or a curved surface, the flat panel light emitting diode can be sheathed with the case of the electronic device by the said IMD process as long as the flat panel light emitting diode can use its flexibility to conform its shape to an inner structure of a mold corresponding to the case of the electronic device. In summary, a light-emitting module provided by the present invention may utilize self-illumination and flexibility characteristics of a flat panel light emitting diode and an IMD process to avoid use of a complicated light guide mechanism, which is needed to make a spot light source generate wide-range light, and solve an uneven brightness distribution problem when a spot light source emits light on a curved surface.

Figure 8:
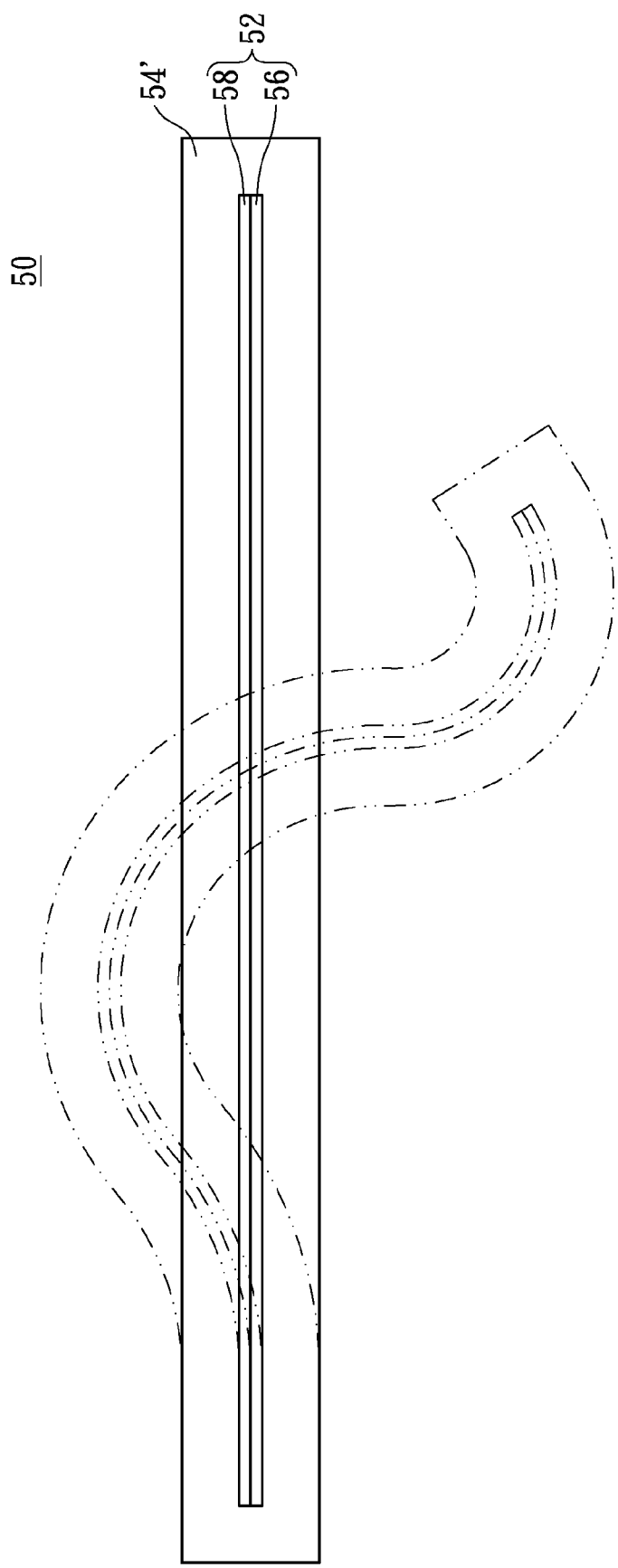
FIG. 8 is a partial cross-sectional diagram of the case structure covering the flat panel light emitting diode.

Please refer to FIG. 8; an alternative embodiment of the present invention is shown. The light-emitting module 50 is a flexural module, which includes the flexible flat panel light emitting diode 52 and a flexible case structure 54'. In other words, the flexible flat panel light emitting diode 52 is integrated in (e.g., fixed inside) the flexible case structure 54' and the light-emitting module 50 can be curved or bent to change the shape thereof by forcing on the light-emitting module 50. The flexible case structure 54' may be a film that is made of transparent compound material. In detail, the transparent compound material of the case structure 54' includes a clay material, a binder material and an acrylic-base oligomer. The clay material may be laponite, mica, vermiculite, montmorillonite, bentonite, saponite or hectorite. The clay material is mixed into water as a dispersion, in which the weight concentration of clay material is ranged about 4% to 10%. The binder material can be a water-soluble polymer, and the water-soluble polymer and the acrylic-base oligomer are used to increase the flexibility and the waterproofness of the flexible case structure 54'. In the embodiment, the acrylic-base oligomer can be a mono-acrylic oligomer or bi-acrylic oligomer. After the film formation of the flexible case structure 54' which is coated on the entire surface of the flat panel light emitting diode 52, the clay material and the acrylic-base oligomer have cross linkage property so as to reduce the free space in the interior of the case structure 54'. Thus, the gas-resistance and the water-resistance of the case structure 54' can be improved. Due to the high gas-resistance and the water-resistance of the case structure 54', the light-emitting module 50 may be applied in high humidity environment, even under the water.

Those skilled in the art will readily observe that numerous modifications and alterations of the device and method may be made while retaining the teachings of the invention.

What is claimed is:

1. A method for manufacturing a light-emitting case comprising:
    forming a flat panel light emitting diode, the flat panel light emitting diode at least having a light-emitting layer and an electrode set formed on the light-emitting layer;
    covering the flat panel light emitting diode with a transparent case structure;
    wherein the flat panel light emitting diode and the transparent case structure are formed of flexible materials by application of force to curve or bend the light-emitting case into a required shape;
    wherein the transparent case structure includes a clay material, a binder material and an acrylic-base oligomer.

2. The method of claim 1, wherein in the step of covering the flat panel light emitting diode comprises a step of covering the entire surface of the flat panel light emitting diode.

3. The method of claim 1, wherein the transparent case structure is formed of a gas-resistant and water-resistant film.

4. The method of claim 1, wherein the step of forming the flat panel light emitting diode at least having the light-emitting layer and the electrode set formed on the light-emitting layer comprises forming the flat panel light emitting diode at least having the light-emitting layer arranged in a specific pattern.

5. The method of claim 1, further comprising a step of disposing the flat panel light emitting diode into a mold having a cavity.

6. The method of claim 1 further comprising a step of utilizing the electrode set to control brightness of the light-emitting layer.

7. The method of claim 1, wherein the flat panel light emitting diode is a PLED (Polymer Light Emitting Diode) or an OLED (Organic Light Emitting Diode).

8. A light-emitting module having a PLED, the light-emitting module comprising:
    a flat panel light emitting diode comprising: a light-emitting layer and an electrode set electrically connected to the light-emitting layer; and
    a transparent case structure formed with the flat panel light emitting diode integrally, wherein the flat panel light emitting diode and the transparent case structure are formed of flexible materials by application of force to curve or bend the light-emitting case into a required shape;
    wherein the transparent case structure includes a clay material, a binder material and an acrylic-base oligomer.

9. The light-emitting module of claim 8, wherein the transparent case structure covers the entire surface of the light-emitting layer.

10. The light-emitting module of claim 8, wherein the transparent case structure is formed of a gas-resistant and water-resistant film.

11. The light-emitting module of claim 8, wherein the flat panel light emitting diode is a PLED (Polymer Light Emitting Diode) or an OLED (Organic Light Emitting Diode).

12. A method for manufacturing a light-emitting case comprising:
    forming a flexible flat panel light emitting diode, the flat panel light emitting diode at least having a light-emitting layer and an electrode set formed on the light-emitting layer; and
    forming a flexible transparent case structure to coat on and seal the entire surface of the flat panel light emitting diode in an integral manner so as to form the light-emitting case a flexural module;
    wherein the flat panel light emitting diode and the transparent case structure are formed of flexible materials by application of force to curve or bend the light-emitting case into a required shape;
    wherein the flexible transparent case structure is a film made of transparent compound material, and comprises a binder material and an acrylic-base oligomer.

13. The method of claim 12, wherein the transparent case structure is formed of a gas-resistant and water-resistant film.

14. The method of claim 12, wherein the step of forming the flat panel light emitting diode at least having the light-emitting layer and the electrode set formed on the light-emitting layer comprises forming the flat panel light emitting diode at least having the light-emitting layer arranged in a specific pattern.

15. The method of claim 12, further comprising a step of disposing the flat panel light emitting diode into a mold having a cavity.

16. The method of claim 12, further comprising a step of utilizing the electrode set to control brightness of the light-emitting layer.

17. The method of claim 12, wherein the flat panel light emitting diode is a PLED (Polymer Light Emitting Diode) or an OLED (Organic Light Emitting Diode).

* * * * *